United States Patent
Kim et al.

(10) Patent No.: US 10,598,021 B2
(45) Date of Patent: Mar. 24, 2020

(54) GAS TURBINE COMPRESSING COOLING SYSTEM PROVIDED WITH COOLING AIR SUPPLY PATHS AROUND OUTER CASING

(71) Applicant: Doosan Heavy Industries & Construction Co., Ltd., Gyeongsangnam-do (KR)

(72) Inventors: Kyung Kook Kim, Daejeon (KR); Dong Hwa Kim, Seoul (KR); Jong Seon Kim, Daejeon (KR); Victor Shemyatovskiy, Gyeongsangnam-do (KR)

(73) Assignee: Doosan Heavy Industries & Construction Co., Ltd., Gyeongsangnam-do (KR)

( * ) Notice: Subject to any disclaimer, the term of this patent is extended or adjusted under 35 U.S.C. 154(b) by 275 days.

(21) Appl. No.: 15/210,431

(22) Filed: Jul. 14, 2016

(65) Prior Publication Data
US 2017/0016397 A1    Jan. 19, 2017

(30) Foreign Application Priority Data
Jul. 14, 2015    (KR) .................. 10-2015-0099956

(51) Int. Cl.
*F01D 5/08*    (2006.01)
*F02C 7/18*    (2006.01)
(Continued)

(52) U.S. Cl.
CPC .............. *F01D 5/081* (2013.01); *F01D 5/085* (2013.01); *F02C 3/06* (2013.01); *F02C 6/08* (2013.01);
(Continued)

(58) Field of Classification Search
CPC ...... F02C 6/06; F02C 6/08; F02C 7/12; F02C 7/18; F02C 7/185; F02C 9/18; F02C 3/06;
(Continued)

(56) References Cited

U.S. PATENT DOCUMENTS

| 2,672,013 A | * | 3/1954 | Lundquist | ............... F01D 5/084 60/726 |
| 3,034,298 A | * | 5/1962 | White | ................ F01D 11/10 60/726 |

(Continued)

FOREIGN PATENT DOCUMENTS

| EP | 1528238 A2 | 5/2005 |
| JP | 2001-123851 A | 5/2001 |

(Continued)

OTHER PUBLICATIONS

International Search Report from PCT/KR2015/012764, dated Mar. 21, 2016.

(Continued)

*Primary Examiner* — Gerald L Sung
*Assistant Examiner* — Alain Chau
(74) *Attorney, Agent, or Firm* — Harness, Dickey & Pierce, P.L.C.

(57) ABSTRACT

The present invention relates to a gas turbine which includes a cooling system provided with cooling air supply paths bypassed through an outside casing and, more specifically, to a gas turbine including a cooling system and a cooling method, wherein, in order to supply cooling air to a plurality of turbine blades and other devices provided to the inside of the gas turbine, cooling air supply paths are not provided to the rotor center shaft of the gas turbine but provided around the outer casing of the gas turbine so as to achieve the increased effect in the aerodynamic efficiency of the com- (Continued)

pressor and the turbine. According to the above structure and method, it may be possible to provide the cooling air supply paths not to the rotor center shaft of the gas turbine but around the outer casing of the gas turbine, thereby finally achieving the increased effect in the aerodynamic efficiency of the compressor and the turbine.

9 Claims, 4 Drawing Sheets

(51) Int. Cl.
  *F02C 3/06* (2006.01)
  *F02C 6/08* (2006.01)
  *F02C 9/18* (2006.01)
(52) U.S. Cl.
  CPC ............... *F02C 7/18* (2013.01); *F02C 7/185* (2013.01); *F02C 9/18* (2013.01); *F05D 2240/61* (2013.01); *F05D 2260/606* (2013.01)
(58) Field of Classification Search
  CPC .......... F01D 5/081; F01D 5/082; F01D 5/085; F01D 5/087; F01D 17/162; F01D 17/163; F01D 25/14; F01D 9/06; F05D 2260/606; F05D 2240/61
  See application file for complete search history.

(56) References Cited

U.S. PATENT DOCUMENTS

| | | | | |
|---|---|---|---|---|
| 3,742,706 | A * | 7/1973 | Klompas | F01D 5/087 415/115 |
| 3,791,758 | A * | 2/1974 | Jenkinson | F01D 5/081 415/116 |
| 4,034,558 | A * | 7/1977 | Korta | F02C 7/18 415/115 |
| 4,113,406 | A | 9/1978 | Lee et al. | |
| 4,296,599 | A * | 10/1981 | Adamson | F02C 7/18 415/115 |
| 4,338,061 | A * | 7/1982 | Beitler | F01D 11/24 415/1 |
| 4,522,562 | A * | 6/1985 | Glowacki | B23H 9/10 415/116 |
| 4,807,433 | A * | 2/1989 | Maclin | F01D 5/081 415/115 |
| 6,487,863 | B1 * | 12/2002 | Chen | F02C 6/08 60/39.12 |
| 6,615,574 | B1 * | 9/2003 | Marks | F02C 7/18 60/772 |
| 8,015,826 | B2 * | 9/2011 | Myers | F01K 13/02 60/782 |
| 8,240,153 | B2 * | 8/2012 | Childers | F02C 6/08 60/782 |
| 8,434,994 | B2 * | 5/2013 | Pal | F02C 3/06 415/1 |
| 8,602,724 | B2 * | 12/2013 | Takahashi | F01D 11/24 415/145 |
| 8,726,672 | B2 * | 5/2014 | Ciofini | F01D 5/082 60/782 |
| 8,973,373 | B2 * | 3/2015 | Arar | F01D 11/24 60/782 |
| 9,206,744 | B2 * | 12/2015 | Maldonado | F01D 25/10 |
| 9,366,194 | B2 * | 6/2016 | Feigl | F02C 9/18 |
| 2002/0172591 | A1 * | 11/2002 | Glynn | F01D 5/081 415/115 |
| 2005/0025614 | A1 * | 2/2005 | Tiemann | F01D 5/084 415/1 |
| 2005/0050901 | A1 * | 3/2005 | Little | F01D 5/08 60/785 |
| 2006/0104808 | A1 * | 5/2006 | Dailey | F01D 5/082 415/115 |
| 2010/0011779 | A1 * | 1/2010 | Senior | F01D 17/105 60/785 |
| 2010/0251727 | A1 * | 10/2010 | Myers | F01K 13/02 60/773 |
| 2011/0072827 | A1 * | 3/2011 | Ciofini | F01D 5/082 60/772 |
| 2011/0079019 | A1 * | 4/2011 | Durocher | F01D 5/082 60/796 |
| 2011/0135456 | A1 * | 6/2011 | Takahashi | F01D 11/24 415/180 |
| 2011/0314776 | A1 | 12/2011 | Bloom | |
| 2013/0067928 | A1 * | 3/2013 | Arias Chao | F02C 7/185 60/782 |
| 2013/0104564 | A1 * | 5/2013 | Arar | F01D 11/24 60/782 |
| 2015/0059355 | A1 * | 3/2015 | Feigl | F02C 9/18 60/782 |

FOREIGN PATENT DOCUMENTS

| | | |
|---|---|---|
| JP | 2002349287 A | 12/2002 |
| JP | 2004-218480 A | 8/2004 |
| KR | 1985-0004298 A | 7/1985 |
| KR | 2009-0131298 A | 12/2009 |
| KR | 2010-0064754 A | 6/2010 |
| KR | 2011-0040747 A | 4/2011 |
| KR | 2011-0053582 A | 5/2011 |
| KR | 2013-0054727 A | 5/2013 |

OTHER PUBLICATIONS

Japanese Office Action dated Oct. 15, 2018 in corresponding Japanese Application Serial No. 2017-558672, with English translation.

International Search Report for PCT/KR2015012764 dated Jan. 18, 2019.

Japanese Office Action dated Apr. 18, 2019 in corresponding Japanese Application Serial No. 2017-558672, with English translation.

* cited by examiner

GAS TURBINE COMPRESSING COOLING SYSTEM PROVIDED WITH COOLING AIR SUPPLY PATHS AROUND OUTER CASING

CROSS-REFERENCE TO RELATED APPLICATIONS

This application claims the benefit and priority of Korean Patent Application No. 10-2015-0099956, filed on Jul. 14, 2015. The entire disclosure of the above application is incorporated herein by reference.

BACKGROUND OF THE INVENTION

Field of the Invention

The present invention relates to a gas turbine which includes a cooling system provided with cooling air supply paths bypassed through an outside casing and, more specifically, to a gas turbine including a cooling system and a cooling method, wherein, in order to supply cooling air to a plurality of turbine blades and other devices provided to the inside of the gas turbine, cooling air supply paths are not provided to the rotor center shaft of the gas turbine but provided around the outer casing of the gas turbine so as to achieve the increased effect in the aerodynamic efficiency of the compressor and the turbine.

Background Art

In general, a turbine generator used for the power generation of a gas turbine generates strong energy by burning fuel through compressed air so as to operate to drive a turbine by using the same.

In this process, one power generation device is provided with a plurality of combustors, and the plurality of combustors are provided with a plurality of fuel supply nozzles. Each one of the fuel supply nozzles injects the mixture of fuel and air so as to generate flames of high temperature, wherein the heat and temperature of the flames are transferred to turbine blades and other constituent elements of the power generation device in full.

Even though each of parts is formed of a material having superior heat resistance, the lifespan of a whole mechanical device thereof is reduced if each of the parts is exposed to excessively high temperature for a long time. In order to prevent this disadvantage, the rapid increase of temperature is prevented by supplying part of the air, compressed by a compressor, to the turbine blades and other constituent parts provided to the power generation device.

However, in the above case, there has been suggested a prior art method for supplying the compressed air discharged from a compressor, which includes a plurality of rotation members, to the turbine blades through a tube, which passes through the center shaft of the gas turbines.

Therefore, according to the prior art method as above, the diameter of the central hole of a gas turbine rotor is increased, and a space is required for inserting an additional tube in order to separate cooling air from the internal space of the rotor. Therefore, the prior art method has problems that the design of the structure for the center shaft in a generator and other devices becomes complicated and, further, the diameter of the center hole of each rotation plate, which drives the compressor and the turbine blades, becomes increased in order to secure a space, through which the cooling air can pass. These disadvantages result in the decrease of the compressor and turbine aerodynamic efficiency.

Therefore, in order to supply cooling air to a plurality of turbine blades and other devices provided to the inside of the gas turbine, it is demanded to improve specific constituent elements of the gas turbine so as to provide a cooling system for obtaining the increased effect in the compressor and turbine aerodynamic efficiency by providing cooling air supply paths through the outside casing of the gas turbine instead of providing the same to the rotor center shaft of the gas turbine.

PRIOR ART DOCUMENT

Patent Document

U.S. Pat. No. 4,113,406

SUMMARY OF THE INVENTION

Accordingly, the present invention has been made to solve the above-mentioned problems occurring in the prior arts, and, in order to supply cooling air to a plurality of turbine blades and other devices provided to the inside of a gas turbine, it is an objective of the present invention to provide a gas turbine including a cooling system, of which cooling air supply paths are not provided to the rotor center shaft of the gas turbine but provided around the outer casing of the gas turbine so as to achieve the increased effect in the aerodynamic efficiency of the compressor and the turbine.

To accomplish the above objective, according to one embodiment of the present invention, in a gas turbine including a compressor, a combustor and turbine blades, there may be provided a gas turbine and turbine blade cooling system, in which the compressor may include a plurality of rotation members, the compressor may be divided into a front-stage compressor, a middle-stage compressor and a rear-stage compressor in sequence from a farthest position from the combustor, and the turbine-blades are formed of a four-stage structure such that induction members are also provided of a four-stage structure respectively to spaces, into which combustion air is introduced for the respective blades, comprising: outside paths for supplying cooling air, which cools the turbine blades of the gas turbine, from the compressor to the turbine blades through the outside of a gas turbine casing; a center shaft path for supplying cooling air, which cools the turbine blades of the gas turbine, from the compressor by penetrating the inside of the center shaft of the gas turbine; and inside paths for supplying cooling air, which cools the turbine blades of the gas turbine, through the connection to the outlet of the compressor.

Further, it may be preferable to provide a gas turbine and turbine blade cooling system, wherein a front-stage compressor, a middle-stage compressor and a rear-stage compressor are respectively provided with inlets of the outside paths, the outside path connected to the front-stage compressor has outlets provided to a fourth-stage air induction member, provided to a space, into which the combustion air is introduced towards a fourth-stage turbine blade, and a combustion air discharge hole cover, the outside path connected to the middle-stage compressor has an outlet provided to a third-stage air induction member, provided to a space, into which the combustion air is introduced towards a third-stage turbine blade, the outside path connected to the rear-stage compressor includes three outlets, each of which is respectively provided to second- and third-turbine blades and a second-stage air induction member, provided to a space, into which the combustion air is introduced towards the second turbine blade, the middle-stage compressor is additionally provided with an inlet of the center shaft path, an outlet of the center shaft path is provided to a fourth-stage turbine blade, and the inside paths directly supply compressed air to a first-stage air induction member, provided to a space, into which the combustion air is introduced towards a first-stage turbine blade, and the first-stage turbine blade.

In addition, it may be possible to provide a gas turbine and turbine blade cooling system, wherein the front-stage compressor, the middle-stage compressor and the rear-stage compressor are respectively provided with the inlets of the outside paths, the outside path connected to the front-stage compressor has the outlets provided to the fourth-stage air induction member, provided to the space, into which the combustion air is introduced towards the fourth-stage turbine blade, and the combustion air discharge hole cover, the outside path connected to the middle-stage compressor has two outlets, each of which is respectively provided to the third-stage turbine blade and the third-stage air induction member, provided to the space, into which the combustion air is introduced towards the third-stage turbine blade, the outside path connected to the rear-stage compressor includes the outlet provided to the second-stage air induction member, provided to the space, into which the combustion air is introduced towards a second turbine blade, the middle-stage compressor is additionally provided with the inlet of the center shaft path, the outlet of the center shaft path is provided to the fourth-stage turbine blade, and the inside paths directly supply compressed air to the first-stage air induction member, provided to the space, into which the combustion air is introduced towards the first-stage turbine blade, and the first- and second-stage turbine blades.

Further, it is also possible to provide a gas turbine and turbine blade cooling system, wherein the front-stage compressor, the middle-stage compressor and the rear-stage compressor are respectively provided with the inlets of the outside paths, the outside path connected to the front-stage compressor has the outlets provided to the fourth-stage air induction member, provided to the space, into which the combustion air is introduced towards the fourth-stage turbine blade, and the combustion air discharge hole cover, the outside path connected to the middle-stage compressor has the outlet provided to the third-stage air induction member, provided to the space, into which the combustion air is introduced towards the third-stage turbine blade, the outside path connected to the rear-stage compressor includes the outlet provided to the second-stage air induction member, provided to the space, into which the combustion air is introduced towards the second turbine blade, the middle-stage compressor is additionally provided with the inlet of the center shaft path, the center shaft path includes two outlets, each of which is respectively provided to the third- and fourth-stage turbine blades, and the inside paths directly supply compressed air to the first-stage air induction member, provided to the space, into which the combustion air is introduced towards the first-stage turbine blade, and the first- and second-stage turbine blades.

Additionally, it is also possible to provide a gas turbine and turbine blade cooling system, wherein the front-stage compressor, the middle-stage compressor and the rear-stage compressor are respectively provided with the inlets of the outside paths, the outside path connected to the front-stage compressor has the outlets provided to the fourth-stage air induction member, provided to the space, into which the combustion air is introduced towards the fourth-stage turbine blade, and the combustion air discharge hole cover, the outside path connected to the middle-stage compressor has the outlet provided to the third-stage air induction member, provided to the space, into which the combustion air is introduced towards the third-stage turbine blade, the outside path connected to the rear-stage compressor includes the outlet provided to the second-stage air induction member, provided to the space, into which the combustion air is introduced towards the second turbine blade, the middle-stage compressor is additionally provided with the inlet of the center shaft path, the center shaft path includes the two outlets, each of which is respectively provided to the third- and fourth-stage turbine blades, and the inside paths has separate paths respectively connected to the first-stage air induction member, provided to the space, into which the combustion air is introduced towards the first-stage turbine blade, and the first- and second-stage turbine blades, so as to directly supply compressed air.

Further, it may be possible to provide at least one or more cooling air control valves to the inlets or paths of the outside paths.

Along with this, it is preferable that a plurality of generator inside paths are provided such that the cooling air transferred from the compressor can be introduced into the lower sides of the first-stage to third-stage blades, and the plurality of generator inside paths are respectively provided with pre-swirlers at the inlets thereof.

Additionally, it may be possible that a plurality of generator inside paths are provided such that the cooling air transferred from the compressor can be introduced into the lower sides of the first-stage to third-stage blades, and a plurality of sealing parts are provided so as to prevent the mixing of the air among the plurality of generator inside paths, or the outside air and the air of the generator inside paths.

Further, it may be possible to provide at least one or more heat exchangers to the inlets or paths of the outside paths.

Additionally, it may be preferable that each of the pre-swirlers includes an inflection point at one point of each of the plurality of airfoil-shaped blade edges provided to the pre-swirlers, and blade sections from the inflection points to the end portions of the blade edges can move side to side with respect to the inflection points, which serve as fixed points, so as to enable the discharge angle adjustment of the fluid.

Further, it may be possible that each of the pre-swirlers has an independent compression ratio.

Furthermore, it may be also possible to provide further means for solving the problems through a cooling method including each step, in addition to the means for solving the problems through the above device.

Typically, in a method for cooling a gas turbine including a compressor, a combustor and turbine blades, it may be possible to provide a gas turbine and turbine blade cooling method, comprising: a cooling air bypass-injecting step for providing a plurality of rotation members to the compressor and transferring cooling air through the outside of a power generating device by providing outside paths on the compressor, which is provided with the plurality of rotation members; a cooling air directly-injecting step for directly transferring cooling air to the inside of each of the turbine blades from the outlet of the compressor; and a cooling air penetratingly-injecting step for transferring cooling air from the compressor, provided with the plurality of rotation members, to the inside of each of the turbine blades by providing inside paths, which penetrate the center shaft of a generator.

Further, it is also possible to provide a gas turbine and turbine blade cooling method, wherein the cooling air bypass-injecting step includes a flow control step for controlling the flow rates of the cooling air by providing at least one or more cooling air control valves to the outside paths.

Further, it is also possible to provide a gas turbine and turbine blade cooling method, wherein the cooling air bypass-injecting step includes a temperature control step for controlling the temperature of the cooling air by providing at least one or more heat exchangers to the outside paths.

As described above, in order to supply the cooling air to the plurality of turbine blades and other devices provided to the inside of the gas turbine, the "gas turbine including a cooling system provided with cooling air supply paths bypassed through the outside casing" according to the present invention, the cooling air supply paths are not provided to the rotor center shaft of the gas turbine but provided around the outside casing of the gas turbine. In addition, it may be possible to provide the pre-swirlers having different compression ratios from each other to the respective paths such that the design of a generator having an optimum efficiency can be implemented, thereby finally resulting in the increased effect of the compressor and turbine aerodynamic efficiency.

BRIEF DESCRIPTION OF THE DRAWINGS

The above and other objectives, features and advantages of the present invention will be apparent from the following detailed description of the preferred embodiments of the invention in conjunction with the accompanying drawings, in which.

BRIEF EXPLANATION OF REFERENCE SYMBOLS

1: gas turbine
2: compressor
4: generator inside path
5: center shaft
6: outside path
7: center shaft path
8: inside path
11: first-stage turbine blade
12: second-stage turbine blade
13: third-stage turbine blade
14: fourth-stage turbine blade
21: first-stage air induction member
22: second-stage air induction member
23: third-stage air induction member
24: fourth-stage air induction member
41: pre-swirler
42: sealing part
201: front-stage compressor
202: middle-stage compressor
203: rear-stage compressor
204: plurality of rotation members
205: compressor outlet

DETAILED DESCRIPTION OF THE PREFERRED EMBODIMENTS

Hereinafter, reference will be now made in detail to the preferred embodiments of the present invention with reference to the attached drawings. In denoting constituent elements in each drawing with reference signs, it should be noted that the same components have the same reference numerals even though they are illustrated in different figures. In addition, in the description of the present invention, when it is judged that detailed descriptions of known functions or structures related with the present invention may make the essential points vague, the detailed descriptions of the known functions or structures will be omitted.

Also, in the description of the constituent elements of the embodiments of the present invention, terms such as first, second, A, B, a, b and the like may be used. These terms are only used for distinguish the constituent elements from any other constituent elements, but the natures, sequences or orders and the like of corresponding constituent elements are not limited by the terms. In the case where some constituent elements are described to be "connected", "coupled or "jointed" to other constituent elements, even though the former constituent elements may be directly connected or jointed to latter constituent elements, it should be understood that any other constituent elements may be also "connected", "coupled" or "jointed" between these constituent elements.

In a gas turbine 1 including a compressor 2, a combustor and turbine blades, there may be provided a gas turbine and turbine blade cooling system, in which the compressor includes a plurality of rotation members 204, the compressor is divided into a front-stage compressor 201, a middle-stage compressor 202 and a rear-stage compressor 203 in sequence from a farthest position from the combustor, and the turbine-blades are formed of a four-stage structure such that induction members are also provided of a four-stage structure respectively to spaces, into which combustion air is introduced for the respectively blades, comprising: outside paths 6 for supplying cooling air, which cools the turbine blades of the gas turbine 1, from the compressor 2 to the turbine blades through the outside of a gas turbine casing; a center shaft path 7 for supplying cooling air, which cools the turbine blades of the gas turbine 1, from the compressor 2 by penetrating the inside of the center shaft 5 of the gas turbine; and inside paths 8 for supplying cooling air, which cools the turbine blades of the gas turbine 1, through the connection to the outlet 205 of the compressor 2.

FIG. 1 to FIG. 4 are perspective views of a gas turbine provided with the compressor 2, the turbine blades and the cooling air supply paths according to an embodiment of the present invention.

Referring to FIG. 1 to FIG. 4, the compressor 2 having the plurality of rotation members 204 are illustrated on the left side and, along these, the compressor outlet 205 and the turbine blades are provided. In order to generate energy for the efficient combustion of the combustor and the operation of the turbine blades so as to generate power, it is preferable to inject air, which is compressed under high pressure, to the peripheries of nozzles at the time of combustion.

To this end, it may be possible to introduce air into the compressor 2 so as to produce high-pressure air through the front-stage compressor 201, the middle-stage compressor 202 and the rear-stage compressor 203 such that this high-pressure air can be moved to the nozzles and the combustor through the compressor outlet 205.

The compressed air, which is introduced into the nozzles and the combustor in this process, is used in combustion and serves to drive the turbine blades in a state, where the compressed air includes energy.

After driving the first-stage turbine blade to the fourth-stage turbine blade, the combustion air is discharged to the outside of a power generation device.

The turbine blades are driven by the compressed air of high pressure and high temperature through the above cycle. Therefore, in order to prevent the mechanical damage and breakdown thereof, it is necessary to provide a device and a method for continuously cooling each of the turbine blades.

To this end, it may be possible to provide the cooling air supply paths to the front-stage compressor, the middle-stage compressor and the rear-stage compressor, and induce the compressed air, thereby supplying the cooling air to each of the turbine blades, each of the air induction members and the like.

Differently from the prior art system for supplying cooling air by providing a tube to the center shaft of a gas turbine, using the outside and inside paths as described above enables the size of each rotation plate of the compressor and the turbine blades of the gas turbine to be increased, resulting in the increase of the compressor and turbine aerodynamic efficiency.

As for specific efficiency increase, the compressor efficiency has been conventionally about 88% but increased close to 90% according to the embodiment of the present invention, and the turbine efficiency is increased from about 89% to 90% or higher.

In addition, it may be possible that the respective first-stage to fourth-stage turbine blades are provided with the air induction members corresponding to the respective stages at the front portions thereof, wherein the air induction members are provided in a fixed manner rather than a rotational manner so as to assist the compressed air to advance towards the turbine blades without friction angles.

The structure of the cooling air supply paths as described above has advantages that the structural stability can be secured by the removal of the separation tube in the shaft and the aerodynamic efficiency can be increased in response to the increase of the outer diameters of the compressor and turbine rotation plates.

Figure 1:
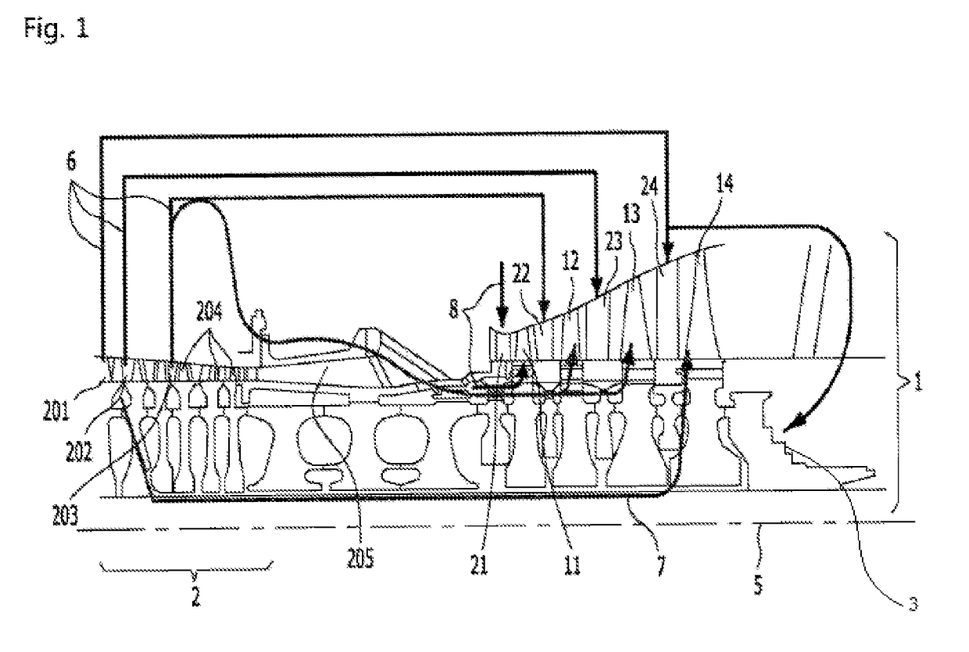
FIG. 1 is a perspective view of a gas turbine, provided with a compressor, turbine blades and cooling air supply paths, according to one embodiment of the present invention.

Further, it may be possible to provide a gas turbine and turbine blade cooling system, wherein the front-stage compressor 201, the middle-stage compressor 202 and the rear-stage compressor 203 are respectively provided with inlets of the outside paths 6, the outside path 6 connected to the front-stage compressor 201 has outlets provided to the fourth-stage air induction member, provided to a space, into which the combustion air is introduced towards the fourth-stage turbine blade, and the combustion air discharge hole cover, the outside path 6 connected to the middle-stage compressor 202 has an outlet provided to a third-stage air induction member, provided to a space, into which the combustion air is introduced towards the third-stage turbine blade, the outside path 6 connected to the rear-stage compressor 203 includes three outlets, each of which is respectively provided to second- and third-turbine blades and the second-stage air induction member, provided to a space, into which the combustion air is introduced towards the second turbine blade, the middle-stage compressor 202 is additionally provided with an inlet of the center shaft path 7, an outlet of the center shaft path 7 is provided to the fourth-stage turbine blade, and the inside paths 8 directly supply the compressed air to the first-stage air induction member, provided to a space, into which the combustion air is introduced towards the first-stage turbine blade, and the first-stage turbine blade.

Figure 2:
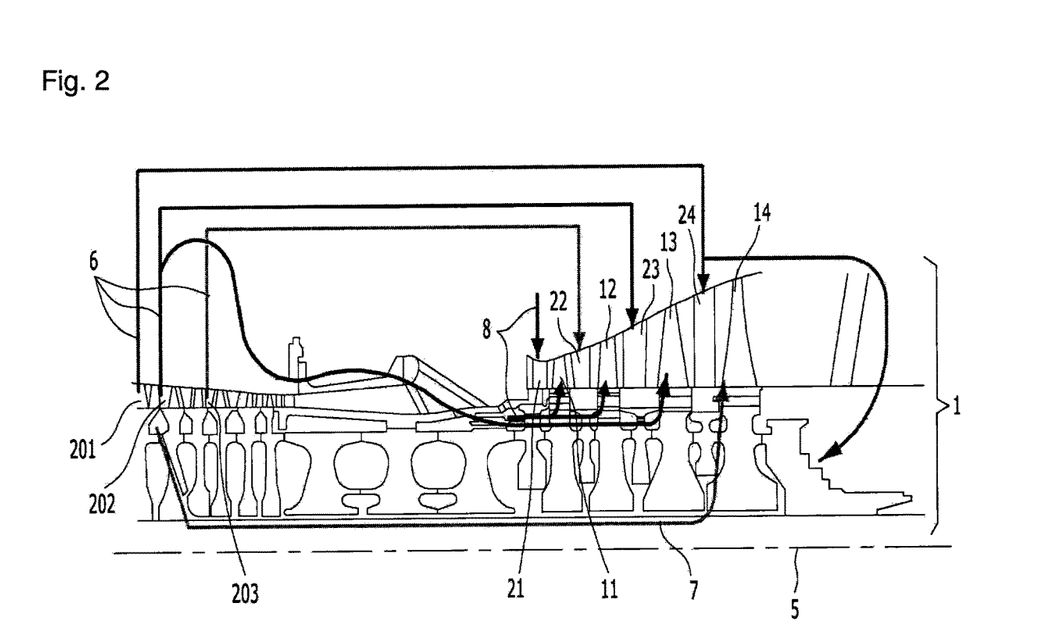
FIG. 2 is a perspective view of a gas turbine, provided with a compressor, turbine blades and cooling air supply paths, according to another embodiment of the present invention.

Additionally, it may be possible to provide a gas turbine and turbine blade cooling system, wherein the front-stage compressor 201, the middle-stage compressor 202 and the rear-stage compressor 203 are respectively provided with the inlets of the outside paths 6, the outside path 6 connected to the front-stage compressor 201 has the outlets provided to the fourth-stage air induction member, provided to the space, into which the combustion air is introduced towards the fourth-stage turbine blade, and the combustion air discharge hole cover 3, the outside path 6 connected to the middle-stage compressor 202 has two outlets, each of which is respectively provided to the third-stage turbine blade and the third-stage air induction member, provided to the space, into which the combustion air is introduced towards the third-stage turbine blade, the outside path 6 connected to the rear-stage compressor 203 includes an outlet provided to the second-stage air induction member, provided to the space, into which the combustion air is introduced towards the second turbine blade, the middle-stage compressor 202 is additionally provided with the inlet of the center shaft path 7, the outlet of the center shaft path 7 is provided to the fourth-stage turbine blade, and the inside paths 8 directly supply the compressed air to the first-stage air induction member, provided to the space, into which the combustion air is introduced towards the first-stage turbine blade, and the first- and second-stage turbine blades.

Figure 3:
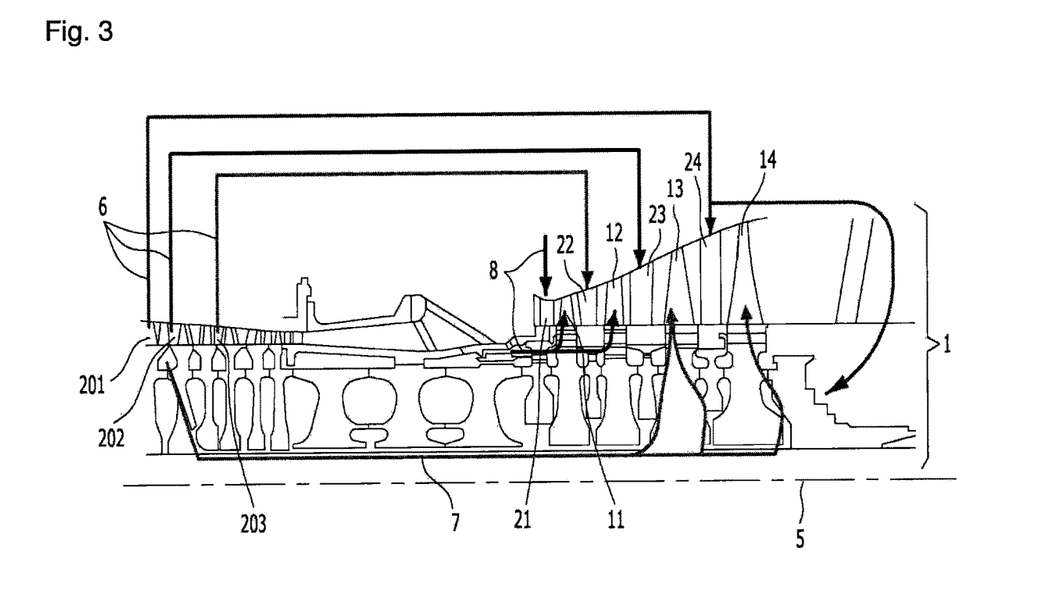
FIG. 3 is a perspective view of a gas turbine, provided with a compressor, turbine blades and cooling air supply paths, according to still another embodiment of the present invention.

Furthermore, as another type, it may be also possible to provide a gas turbine and turbine blade cooling system, wherein the front-stage compressor 201, the middle-stage compressor 202 and the rear-stage compressor 203 are respectively provided with the inlets of the outside paths 6, the outside path 6 connected to the front-stage compressor 201 has the outlets provided to the fourth-stage air induction member, provided to the space, into which the combustion air is introduced towards the fourth-stage turbine blade, and the combustion air discharge hole cover 3, the outside path 6 connected to the middle-stage compressor 202 has the outlet provided to the third-stage air induction member, provided to the space, into which the combustion air is introduced towards the third-stage turbine blade, the outside path 6 connected to the rear-stage compressor 203 includes the outlet provided to the second-stage air induction member, provided to the space, into which the combustion air is introduced towards the second turbine blade, the middle-stage compressor 202 is additionally provided with the inlet of the center shaft path 7, the center shaft path 7 includes two outlets, each of which is respectively provided to the thirdand fourth-stage turbine blades, and the inside paths 8 directly supply the compressed air to the first-stage air induction member, provided to the space, into which the combustion air is introduced towards the first-stage turbine blade, and the first- and second-stage turbine blades.

Figure 4:
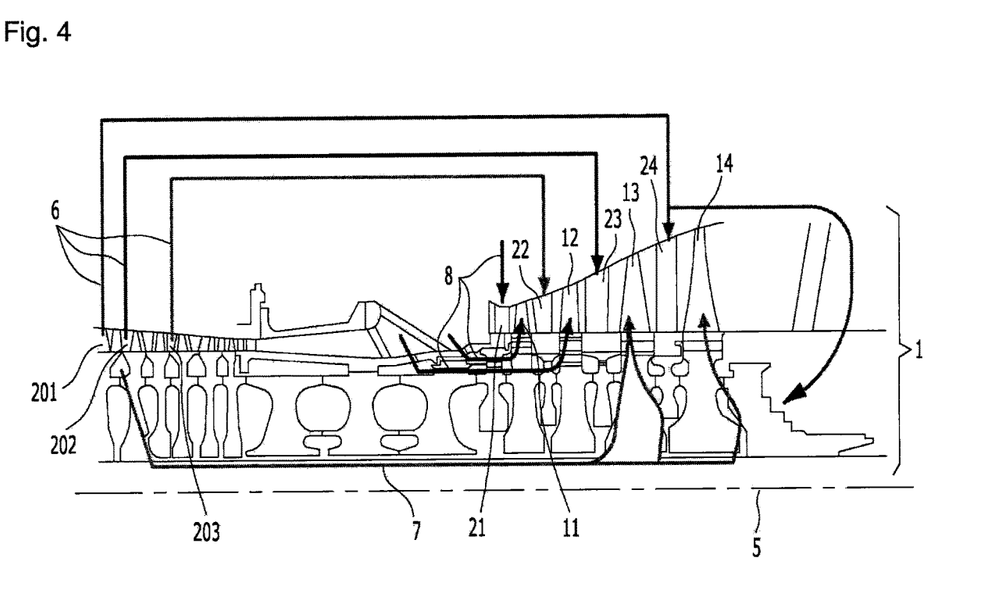
FIG. 4 is a perspective view of a gas turbine, provided with a compressor, turbine blades and cooling air supply paths, according to a further embodiment of the present invention.

As still another type, it may be also possible to provide a gas turbine and turbine blade cooling system, wherein the front-stage compressor 201, the middle-stage compressor 202 and the rear-stage compressor 203 are respectively provided with the inlets of the outside paths 6, the outside path 6 connected to the front-stage compressor 201 has the outlets provided to the fourth-stage air induction member, provided to the space, into which the combustion air is introduced towards the fourth-stage turbine blade, and the combustion air discharge hole cover 3, the outside path 6 connected to the middle-stage compressor 202 has the outlet provided to the third-stage air induction member, provided to the space, into which the combustion air is introduced towards the third-stage turbine blade, the outside path 6 connected to the rear-stage compressor 203 includes the outlet provided to the second-stage air induction member, provided to the space, into which the combustion air is introduced towards the second turbine blade, the middle-stage compressor 202 is additionally provided with the inlet of the center shaft path 7, the center shaft path 7 includes the two outlets, each of which is respectively provided to the third- and fourth-stage turbine blades, and the inside paths 8 has separate paths respectively connected to the first-stage air induction member, provided to the space, into which the combustion air is introduced towards the first-stage turbine blade, and the first- and second-stage turbine blades, so as to directly supply compressed air.

If this type is used, it may be resulted in the efficiency increase by applying a two-stage blade pre-swirler 41, differently from any other types.

Further, it may be possible to provide at least one or more cooling air control valves to the inlets or paths of the outside paths 6.

Furthermore, it may be possible to provide at least one or more heat exchangers to the inlets or paths of the outside paths 6.

Through the one or more heat exchangers provided to the inlets or paths of the outside paths 6, it is possible to decrease the temperature of the cooling air, which has passed the compressor, so as to finally maximize the cooling effect of the gas turbine and the turbine blades.

Therefore, there is an advantage that the temperature of each device can be recognized using sensors, which are provided to the inside of the power generation device, such that the cooling air supply amount can be controlled.

These advantages cannot be conventionally achieved since the supply path is provided to the gas turbine center shaft. However, providing the cooling air supply paths around the outside of the gas turbine casing, the structure of the control valves as above can be achieved.

Figure 5:
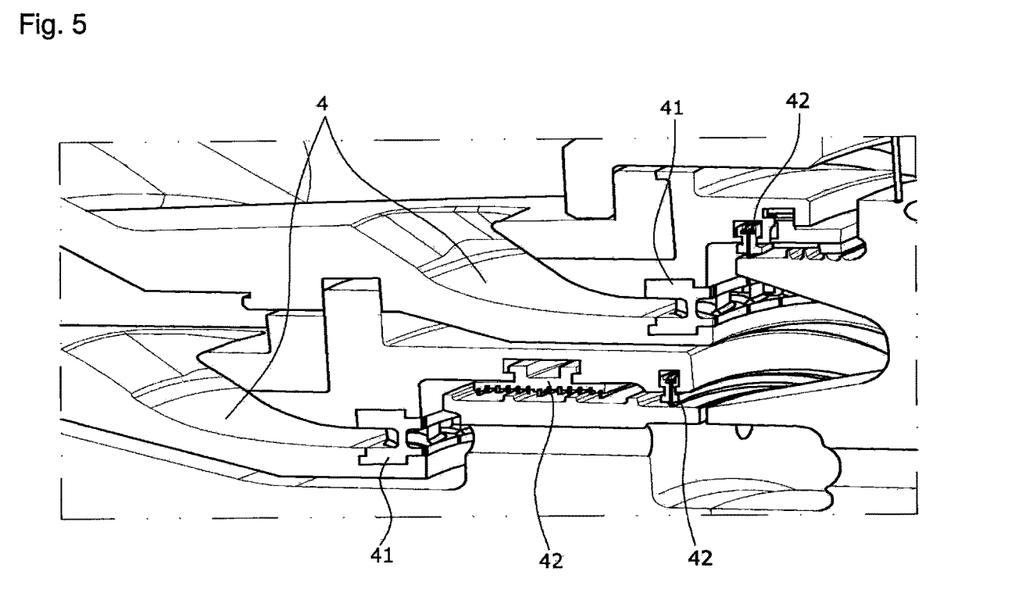
FIG. 5 is a side cross-sectional view showing the internal structure of a gas turbine, including a plurality of generator inside paths, pre-swirlers and sealing parts, according to an embodiment of the present invention.

Additionally, a plurality of generator inside paths 4 may be provided such that the cooling air transferred from the compressor 2 can advance towards the insides of the lower sides of the first-stage to third-stage blades, and the plurality of generator inside paths 4 may be respectively provided with the pre-swirlers 41 at the inlets thereof.

Figure 6:
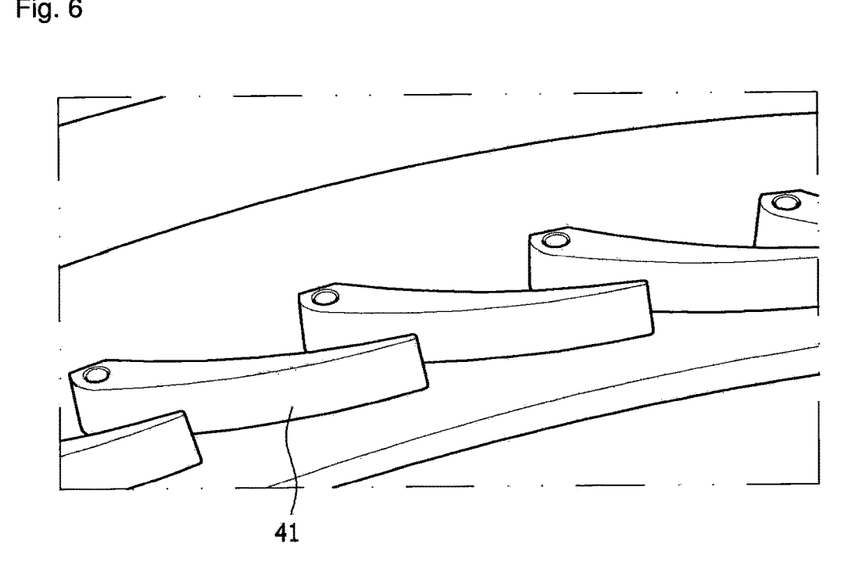
FIG. 6 is an expanded perspective view showing the pre-swirlers according to the embodiment of the present invention.
Figure 7:
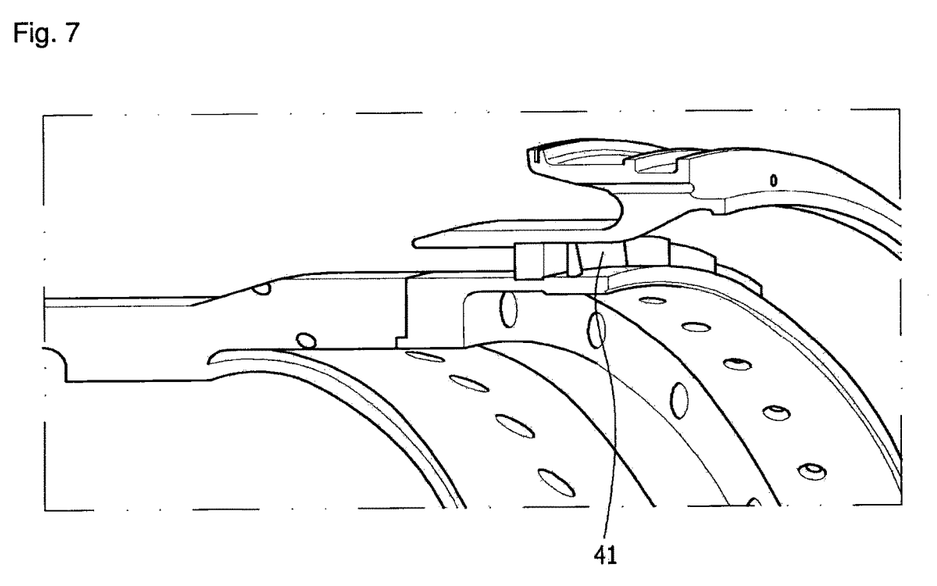
FIG. 7 is an expanded perspective view showing the pre-swirlers according to the embodiment of the present invention.

The pre-swirlers are formed in the shape of a plurality of airfoils or holes so as to swirl the air, which is introduced linearly.

Additionally, it may be preferable that each of the pre-swirlers 41 includes an inflection point at one point of each of the plurality of airfoil-shaped blade edges provided to the pre-swirlers 41, and blade sections from the inflection points to the end portions of the blade edges can move side to side with respect to the inflection points, which serve as fixed points, so as to enable the discharge angle adjustment of the fluid.

As described above, the blade sections from the inflection points provided to the pre-swirlers 41 to the end portions of the blade edges can move side to side with respect to the inflection points, which serve as the fixed points, so as to enable the discharge angle adjustment of the fluid. Therefore, the discharge angle of the fluid, which is discharged by passing the respective blade edges of the pre-swirlers, can be constantly adjustable at a remote position.

The discharge angle and velocity of the fluid can be frequently adjusted such that the pressure ratio of the fluid, which is introduced into the gas turbine and the turbine blades, can be adjusted close to 1. Therefore, it may be possible to realize a more efficient cooling system of the gas turbine and the turbine blades.

Further, it may be possible that each of the pre-swirlers 41 has an independent compression ratio.

It may be possible that an appropriate compression ratio for the maximization of the cooling efficiency and the minimization of the loss is set for each of the pre-swirlers 41 according to the kinds and positions of the supply paths and then the pre-swirlers 41 are provided to the inside of the supply paths.

As for each of the pre-swirlers 41 having an independent compression ratio, it may be possible to set a compression ratio according to a simulation result value in design and then provided the same to each of the insides of the supply paths. In addition, there is a further advantage that, if such a compression ratio of each of the pre-swirlers 41 has to be changed in a state, where the operation of the generator is stopped, then each of the pre-swirlers 41 can be separated so as to correct the compression ratio thereof at any time.

Additionally, it may be possible to provide a gas turbine and turbine blade cooling system, wherein the plurality of generator inside paths 4 are provided such that the cooling air transferred from the compressor 2 can be introduced into the lower sides of the first-stage to third-stage blades, and a plurality of sealing parts 42 are provided so as to prevent the mixing of the air among the plurality of generator inside paths 4, or the outside air and the air of the generator inside paths 4.

In order to form the inside paths appropriate for the structural types according to the present invention, the sealing part prevents the cooling air from flowing to unnecessary paths.

Furthermore, it may be also possible to provide a cooling method including each step, in addition to the device-relating structures described above.

Typically, in a method for cooling the gas turbine including the compressor 2, the combustor and the turbine blades, it may be possible to provide a gas turbine and turbine blade cooling method, comprising: a cooling air bypass-injecting step for providing a plurality of rotation members 204 to the compressor 2 and transferring cooling air through the outside of a power generating device by providing outside paths 6 on the compressor 2, which is provided with the plurality of rotation members 204; a cooling air directly-injecting step for directly transferring cooling air to the inside of each of the turbine blades from the outlet of the compressor 2; and a cooling air penetratingly-injecting step for transferring cooling air from the compressor 2, provided with the plurality of rotation members 204, to the inside of each of the turbine blades by providing inside paths 8, which penetrate the center shaft 5 of a generator. The sequence for carrying out the above steps is not limited, and the cooling air bypass-injecting step may include further steps described hereinafter.

Additionally, it may be possible to provide a gas turbine and turbine blade cooling method, wherein the cooling air bypass-injecting step includes a flow control step for controlling the flow rates of the cooling air by providing at least one or more cooling air control valves to the outside paths 6.

Further, it may be possible to provide a gas turbine and turbine blade cooling method, wherein the cooling air bypass-injecting step includes a temperature control step for controlling the temperature of the cooling air by providing at least one or more heat exchangers to the outside paths 6.

As described above, while the present invention has been particularly shown and described with reference to the example embodiments thereof, it will be understood by those of ordinary skill in the art that the above embodiments of the present invention are all exemplified and various changes, modifications and equivalents may be made therein without changing the essential characteristics and scope of the present invention. Therefore, it would be understood that the present invention is not limited to the forms described in the example embodiments and the technical and protective scope of the present invention shall be defined by the following claims. In addition, it should be also understood that all modifications, changes and equivalences within the technical scope of the present invention defined by the following claims belong to the technical scope of the present invention.

What is claimed is:

1. A gas turbine and turbine blade cooling system, including a compressor, a combustor and turbine blades, in which the compressor includes a plurality of rotation members, and the compressor is divided into a front-stage compressor, a middle-stage compressor and a rear-stage compressor in sequence from a farthest position from the combustor, comprising:
    a plurality of outside paths of the turbine blade cooling system for introducing fluid from the compressor to the turbine blades, each of the plurality of outside paths travelling independently along an exterior of a gas turbine casing;
    a center shaft path of the turbine blade cooling system for supplying the fluid from the compressor to the turbine blades that travels along an interior of a center shaft of the gas turbine; and
    a plurality of inside paths of the turbine blade cooling system for supplying the fluid from the compressor to the turbine blades through an outlet of the compressor along an interior of the gas turbine casing, wherein the fluid introduced through the plurality of outside paths, the center shaft path, or the plurality of inside paths cools at least part of the turbine blades,
    the front-stage compressor, the middle-stage compressor, and the rear-stage compressor are respectively provided with inlets of the plurality of outside paths,
    a respective outside path of the plurality of outside paths that is connected to the front-stage compressor has a first outlet provided to at least a first air induction member and a second outlet provided to a location downstream from the turbine blades, and
    a respective outside path of the plurality of outside paths that is connected to the middle-stage compressor has a third outlet provided to at least a second air induction member located upstream from the first air induction member, and a fourth outlet that travels along the interior of the gas turbine casing and provides the fluid from the middle-stage compressor directly to one of the turbine blades that is provided downstream from the second air induction member.

2. The gas turbine and turbine blade cooling system, according to claim 1, wherein
    a respective outside path of the plurality of outside paths that is connected to the rear-stage compressor is provided to at least a third air induction member,
    the middle-stage compressor is additionally provided with an inlet of the center shaft path, and a fifth outlet of the center shaft path is provided to at least one of the turbine blades, and
    the plurality of inside paths directly supply the fluid to at least one of the first, second, and third air induction members and at least one of the turbine blades.

3. The gas turbine and turbine blade cooling system, according to claim 2, wherein
    the fifth outlet of the center shaft path includes a pair of outlets that each are respectively provided to at least one of the turbine blades.

4. The gas turbine and turbine blade cooling system, according to claim 3, wherein
    the plurality of inside paths are respectively connected to at least one of the first, second, and third air induction members and at least one of the turbine blades so as to directly supply the fluid thereto.

5. The gas turbine and turbine blade cooling system, according to claim 1, wherein
    the inlets of the plurality of outside paths or portions of the plurality of outside paths downstream from the respective inlets are provided with at least one or more cooling air control valves.

6. The gas turbine and turbine blade cooling system, according to claim 1, wherein
    a plurality of generator inside paths are provided such that the fluid transferred from the compressor can advance to a lower side of at least one of the turbine blades, and
    the plurality of generator inside paths are respectively provided with pre-swirlers at inlets of the plurality of generator inside paths.

7. The gas turbine and turbine blade cooling system, according to claim 6, wherein
    each of the pre-swirlers has an independent compression ratio.

8. The gas turbine and turbine blade cooling system, according to claim 1, wherein
    a plurality of generator inside paths are provided such that the fluid transferred from the compressor can advance to a lower side of at least one of the turbine blades, and
    a plurality of sealing parts are provided so as to prevent intermixing of the fluid among the plurality of generator inside paths, or intermixing of outside air and the fluid of the generator inside paths.

9. The gas turbine and turbine blade cooling system, according to claim 1, wherein
    the inlets of the plurality of outside paths or portions of the plurality of outside paths downstream from the respective inlets are provided with at least one or more heat exchangers.

* * * * *